(12) United States Patent
Reeve (10) Patent No.: US 9,061,702 B2
(45) Date of Patent: Jun. 23, 2015

(54) STEERING SYSTEMS

(75) Inventor: John Martin Reeve, Coventry (GB)

(73) Assignee: TRW Automotive US LLC, Livonia, MI (US)

( * ) Notice: Subject to any disclaimer, the term of this patent is extended or adjusted under 35 U.S.C. 154(b) by 423 days.

(21) Appl. No.: 12/990,555

(22) PCT Filed: May 1, 2009

(86) PCT No.: PCT/IB2009/051787
§ 371 (c)(1),
(2), (4) Date: Apr. 19, 2011

(87) PCT Pub. No.: WO2009/133534
PCT Pub. Date: Nov. 5, 2009

(65) Prior Publication Data
US 2011/0190984 A1  Aug. 4, 2011

(30) Foreign Application Priority Data
May 1, 2008  (GB) .................................. 0807935.2

(51) Int. Cl.
| | |
|---|---|
| B62D 6/10 | (2006.01) |
| B62D 5/04 | (2006.01) |
| B60W 10/20 | (2006.01) |
| G01M 17/06 | (2006.01) |

(52) U.S. Cl.
CPC .............. *B62D 5/0481* (2013.01); *B62D 5/049* (2013.01); *B62D 5/0487* (2013.01); *B62D 6/10* (2013.01); *B60W 10/20* (2013.01); *B62D 5/0457* (2013.01); *G01M 17/06* (2013.01)

(58) Field of Classification Search
USPC ............. 180/442, 443, 446; 318/561; 701/21, 701/300, 31.4, 41, 42, 80; 710/41
See application file for complete search history.

(56) References Cited

U.S. PATENT DOCUMENTS

| | | | |
|---|---|---|---|
| 4,745,984 A | 5/1988 | Shimizu | |
| 5,764,015 A * | 6/1998 | Shimizu et al. | ............... 318/587 |
| 2002/0026267 A1* | 2/2002 | Kifuku | .......................... 701/41 |
| 2002/0026270 A1 | 2/2002 | Kurishige et al. | |
| 2003/0121716 A1* | 7/2003 | Yamada et al. | ............... 180/446 |

(Continued)

FOREIGN PATENT DOCUMENTS

| | | | |
|---|---|---|---|
| JP | 06144280 A | 5/1994 | |
| JP | 2007125973 A | 5/2007 | |

*Primary Examiner* — Fadey Jabr
*Assistant Examiner* — Kevin P Mahne
(74) *Attorney, Agent, or Firm* — MacMillan, Sobanski & Todd, LLC (57) ABSTRACT

A method of monitoring the condition of a steering system comprises the steps of repeatedly measuring the angular position of a steering wheel, identifying from the measurements of steering wheel position a first moment in time at which the steering wheel comes to rest in an off center position following movement in a first direction away from a straight ahead position, measuring the torque applied to the steering system at that first moment in time, identifying from the measurements of steering wheel position a second moment in time at which the steering wheel first starts to moves away from the off center position in the opposite direction to the first direction, measuring the torque applied to the steering system at that second moment in time, calculating the difference between the measured torques at the first moment of time and second moment of time to provide a static friction value and comparing the calculated static friction value with a target static friction value to provide an indication of the condition of the steering system.

11 Claims, 7 Drawing Sheets

(56) References Cited

U.S. PATENT DOCUMENTS

| | | |
|---|---|---|
| 2004/0016594 A1 | 1/2004 | Yasui et al. |
| 2004/0148077 A1* | 7/2004 | Yasui et al. .................... 701/41 |
| 2008/0189014 A1* | 8/2008 | Tanaka et al. ................... 701/42 |
| 2008/0288154 A1* | 11/2008 | Fayyad et al. ................. 701/101 |
| 2009/0150018 A1* | 6/2009 | Brown et al. ................... 701/29 |

* cited by examiner

STEERING SYSTEMS

CROSS-REFERENCE TO RELATED APPLICATIONS

This application is a national stage of International Application No. PCT/IB2009/051787 filed May 1, 2009, which claimed priority to Great Britain Patent Application No. 0807935.2 filed May 1, 2008, the disclosures of which are incorporated herein by reference.

BACKGROUND OF THE INVENTION

This invention relates to a method of diagnosing the condition of a steering system of a vehicle during use and to a diagnostic system suitable for fitment to a vehicle that carries out the method. It also relates to an electric power steering system which is able to compensate for certain changes in its condition.

The correct operation of the steering system of a vehicle is critical to its safety. In use, the system can become damaged or worn. For example, a component could be bent if struck by a rock that is flicked up from the road by the wheels of the vehicle. The bearings at the joints in the system or rack gear could become worn or damaged. Wear or damage can make the car unsafe to drive, or at the least cause the steering to feel strange. Worn bearings can make the steering wheel harder to turn by increasing the friction that must be overcome at the joint. If wear or damage is severe, it is probable that a driver would notice and take the vehicle to a garage for repair. Less severe damage, still potentially a safety concern, is unlikely to be noticed by the driver. This is especially true for electric power assisted steering, in which torque is applied to the column by a motor acting through a worm and wheel. Wear in the rack may be undetectable by the driver, but could lead to premature failure of the assistance system. Normal servicing for vehicles often calls for little more than a visual inspection of the steering at regular intervals, which may not pick up wear or damage.

BRIEF SUMMARY OF THE INVENTION

According to a first aspect the invention provides a method of monitoring the condition of a steering system comprising the steps of:
(a) repeatedly measuring the angular position of a steering wheel,
(b) identifying from the measurements of steering wheel position a first moment in time at which the steering wheel comes to rest in an off centre position following movement in a first direction away from a straight ahead position,
(c) measuring the torque applied to the steering system at that first moment in time,
(d) identifying from the measurements of steering wheel position a second moment in time at which the steering wheel first starts to moves away from the off centre position in the opposite direction to the first direction,
(e) measuring the torque applied to the steering system at that second moment in time,
(f) calculating the difference between the measured torques at the first moment of time and second moment of time to provide a static friction value that is dependent upon the static friction $T_{friction}$ in the steering system, and
(g) comparing the calculated static friction $T_{friction}$ value with a target static friction value to provide an indication of the condition of the steering system.

The calculated static friction value maybe an actual estimate of static friction, derived by calculating half of the difference in the torque values, or a pure difference value which will be proportional to static friction (actually double).

The method may comprise the step of determining the time elapsed between the first and second moments in time and, in the event that the elapsed time exceeds a target limit time rejecting the estimate of static friction. Alternatively, an estimate of static friction may simply not be calculated if the elapsed time is too great. The reason for this is that too long an elapsed time would mean it is unlikely that the load on the steering during the elapsed time was constant, making the calculation used in step (f) unsuitable for determining a reliable estimate.

The steps of the method may be repeated during continued use of the steering system such that multiple estimates of static friction may be calculated. One or more previously estimated static friction values may be used as the target static friction value. In effect, this means that any changes in static friction over time will provide an indication of the steering condition.

The applicant has noted that one common effect of damage or wear to the steering is a change in the levels of static friction. This is the torque that is needed to make the steering move from stationary and is supplied by a combination of handwheel and (optionally) assistance torque. The magnitude of static friction also depends upon the load that is on the system (i.e., if it is heavily loaded, then it will stick tighter).

The applicant has therefore appreciated for the first time that the condition of the steering could be monitored by measuring these friction levels whilst the steering system is in use by following the steps of the first aspect of the invention. The invention can therefore provide increased levels of safety within the steering system by alerting a driver or a garage to possible wear in the steering gear which may not be picked up during routine visual inspection.

To understand how the static friction can be estimated in step (f), consider the behaviour of the system just prior to and after stopping:

Outgoing, as motion stops:

$$T_{tot(out)} = T_{load} + T_{friction} \quad (1)$$

Returning, as motion about to start:

$$T_{tot(rtn)} = T_{load} - T_{friction} \quad (2)$$

Where $T_{tot}$ is the total torque applied to the steering system ($T_{handwheel} + T_{assistance}$) and $T_{load}$ is the load applied by the roadwheels.

Provided that the system is stationary for only a short time, it is reasonable to assume $T_{load}$ is constant in each equation so:

$$T_{tot(out)} - T_{tot(rtn)} = 2(T_{friction}) \quad (3)$$

This is a direct measure of system hysteresis or static friction.

Substituting $T_{friction}$ into (1) or (2) yields $T_{load}$ which may also be of interest.

The method may include determining the vehicle speed at the time of the two measurements, and rejecting the estimate of static friction (or not calculating an estimate) if the speeds are different. A constant speed suggests that it is reasonable to assume that $T_{load}$ is constant.

The method may comprise a step of determining the position of the steering wheel by measuring the position of the wheel relative to a predetermined datum. This datum may comprise the straight ahead position of the steering wheel. The position may be measured directly using a position sensor fixed to a part of the steering such as the steering column, or indirectly using an output from an alternative sensor which can be correlated to position. For example, where an electric motor is connected to the steering column the position of the motor could be measured and the column position estimated from that measurement. In a practical implementation, it is likely that some movement of the motor may actually occur while the system is "stationary" as the torsion in various parts of the system changes as the applied torque changes (e.g. torsion bar in torque sensor, deflection in shafts etc, and this should be allowed for when determining torque from motor movement.

The method may comprise measuring speed directly using a speed sensor fitted to the vehicle, or perhaps a GPS speed measurement.

The method may comprise measuring the torque directly using a torque sensor fitted to the steering system.

The method is especially suited to vehicles with electric power assisted steering because these systems generally already include sensors that measure steering torque, column position and vehicle speed as required as inputs to the method. The output of these sensors can easily be reused by the method of the present invention, reducing the need for additional dedicated hardware.

In a practical implementation of the method the following sequence of steps may be performed:
identify a change in position of the steering wheel by repeatedly monitoring the output of a position sensor and on each change in the output store in an electronic memory the time, torque, position and direction of movement of the wheel as an entry condition;
continue to store the maximum and minimum torque since the time of storing of the entry condition;
upon detecting the next change in position of the steering wheel compare current time with stored time to determine how long has been stationary, and if the elapsed time is above a threshold continue to maintain minimum and maximum torque value record else set an exit condition and report the difference between minimum and maximum values.

The implementation may also include steps of recording the direction of movement of the steering wheel on exit and total time elapsed between recording entry and exit conditions and, if the direction of movement is opposite and the time exceeds a threshold, raising a raise flag to indicate that the difference measured is a valid measurement; else, reject the measurement as invalid.

In addition to, or as an alternative to estimating static friction the method may estimate the dynamic friction of the steering. A dynamic friction value may be determined for each of several different steering rates (i.e. rate of rotation of the steering wheel in column degrees per second), and compared with individual target for each rate.

The method may comprise steps of estimating the dynamic friction by:
measuring the torque carried by the steering column as it passes through an outward range of steering angles whilst moving away from the centre position;
measuring the torque carried by the steering column when subsequently passing through the same range of steering angles as the steering returns towards the centre position;
measuring the steering column velocity as it passes through the range of angles, and
processing the torque measurements to estimate dynamic torque.

The method may estimate the condition of the steering by comparing the estimated dynamic friction with a predetermined target dynamic friction value.

The measure of torque carried over the range of angles in each step may be a measure of the average torque across the range. This is preferred to an instantaneous measurement (e.g. a very narrow range) as it helps average out high frequency random noise in the measurements. The range of angles, on the other hand, should not be so great that any significant change in torque is likely over the range. A range of about 5 to 10 degrees has been found to work well.

The method may comprise measuring the elapsed time between the steering passing through the two ranges of angles, and rejecting the measurements if the time exceeds a predetermined limit. It may also reject them if the measured steering column velocity on the outward and return passes differs significantly. By this we mean differs by more than a predetermined amount. The velocity may be determined by differentiating position measurements over time. Steering speed is also usually a variable already available in the steering system To understand how dynamic friction can be estimated in the manner described, first it is possible to equate power in the system while passing through a range of steering angles away from (out) and returning towards centre whereby we get:
During outward travel:

$$T_{out}\omega_{out} = (T_{Lout} + T_{fout})\omega_{out} \quad (4)$$

Where $T_{out}$ is the torque on the outward range of measurements, $\omega_{out}$ is the outward velocity, $T_{fout}$ is the dynamic friction torque during the outward range of movements and $T_{Lout}$ is the static load on the steering over that range.

During return travel:

$$T_{rtn}\omega_{rtn} = (T_{Lrtn} - T_{frtn})\omega_{rtn} \quad (5)$$

where $T_{rtn}$ is the total torque measured on the return range of measurements, $\omega_{rtn}$ is the return velocity, $T_{frtn}$ is the dynamic torque during the return range of movements and $T_{Lrtn}$ is the static load on the steering over that range.

If the measurement sections are in the same manoeuvre, the load may be assumed constant between the two ranges and hence between equations (4) and (5) and If $\omega_{out}$ and $\omega_{rtn}$ are close enough to be treated as the same, then the dynamic friction may be assumed constant within the measurements, hence:

$$T_{out} - T_{rtn} = 2(T_f) \quad (6),$$

where $T_f$ is the dynamic friction.

Substituting $T_f$ from (6) into (4) and (5) also yields load torque $T_L$ which is the load torque which may also be of interest.

If the speeds $\omega_{out}$ and $\omega_{rtn}$ are not the same then only the speed dependent portion of dynamic friction will be affected and the above equation will return the average dynamic friction for the average speed. Hence, the dynamic friction for each speed may be recovered by rearrangement and scaling of (4) and (5).

The method may determine a plurality of different estimates of dynamic friction, each one corresponding to a different steering velocity and range of steering angles. A corresponding plurality of target dynamic friction values may be stored.

In any event, the method may include the step of raising an alarm or warning in the event that the comparison with the target (static and/or dynamic) indicates excessive wear of the steering system (either by exceeding a threshold and/or by a sudden change). This could be achieved by illuminating a warning light on the vehicle or by logging a fault in the on-board diagnostic computer of the vehicle for access during a service.

According to a second aspect the invention provides apparatus for monitoring the condition of a steering system fitted to a vehicle comprising:

a torque sensor which provides an output signal indicative of the torque carried by the steering system, a column position sensor which measures the angular position of the steering wheel; and processing means arranged to process respective output signals received from the two sensors, in which the processing means is arranged to:

(a) repeatedly measure the angular position of a steering wheel, (b) identify from the measurements of steering wheel position a first moment in time at which the steering wheel comes to rest in an off centre position following movement in a first direction away from a straight ahead position, (c) measure the torque applied to the steering system at that first moment in time, (d) identify from the measurements of steering wheel position a second moment in time at which the steering wheel first starts to moves away from the off centre position in the opposite direction to the first direction, (e) measure the torque applied to the steering system at that second moment in time, (f) calculate the difference between the measured torques at the first moment of time and second moment of time to provide a static friction value that is dependent upon the static friction $T_{friction}$ in the steering system, and (g) compare the calculated static friction $T_{friction}$ value with a target static friction value to provide an indication of the condition of the steering system The torque sensor may measure the torque applied by the driver and the torque applied to the steering by an optional electric actuator that forms part of an electric power steering system. The torque measurement used by the processing means should be the total applied torque, i.e. the sum of the hand wheel and applied torques.

The torque sensor may provide a periodic output signal. Processing means may store torque and correspond position at each sample.

The apparatus may also estimate dynamic friction and use the estimate to determine the condition of the steering. It may do this using any feature of the method of the first aspect of the invention.

According to a third aspect the invention provides a data carrier which carries program instruction that when running on a processor cause the processor to perform the method of the first aspect of the invention.

According to a fourth aspect the invention provides an electric power assisted steering system in which a measurement of at least one of static friction and dynamic friction is used to tailor the assistance torque profile of the motor to the frictional characteristics of the system.

The characteristics may vary over time and the fourth aspect of the invention may be used to compensate for these changes in the condition of the steering over time by changing the assistance torque profile. It may change the profile so that the variations over time are imperceptible to a user of the system.

Other advantages of this invention will become apparent to those skilled in the art from the following detailed description of the preferred embodiments, when read in light of the accompanying drawings.

DETAILED DESCRIPTION OF THE INVENTION

Figure 1:
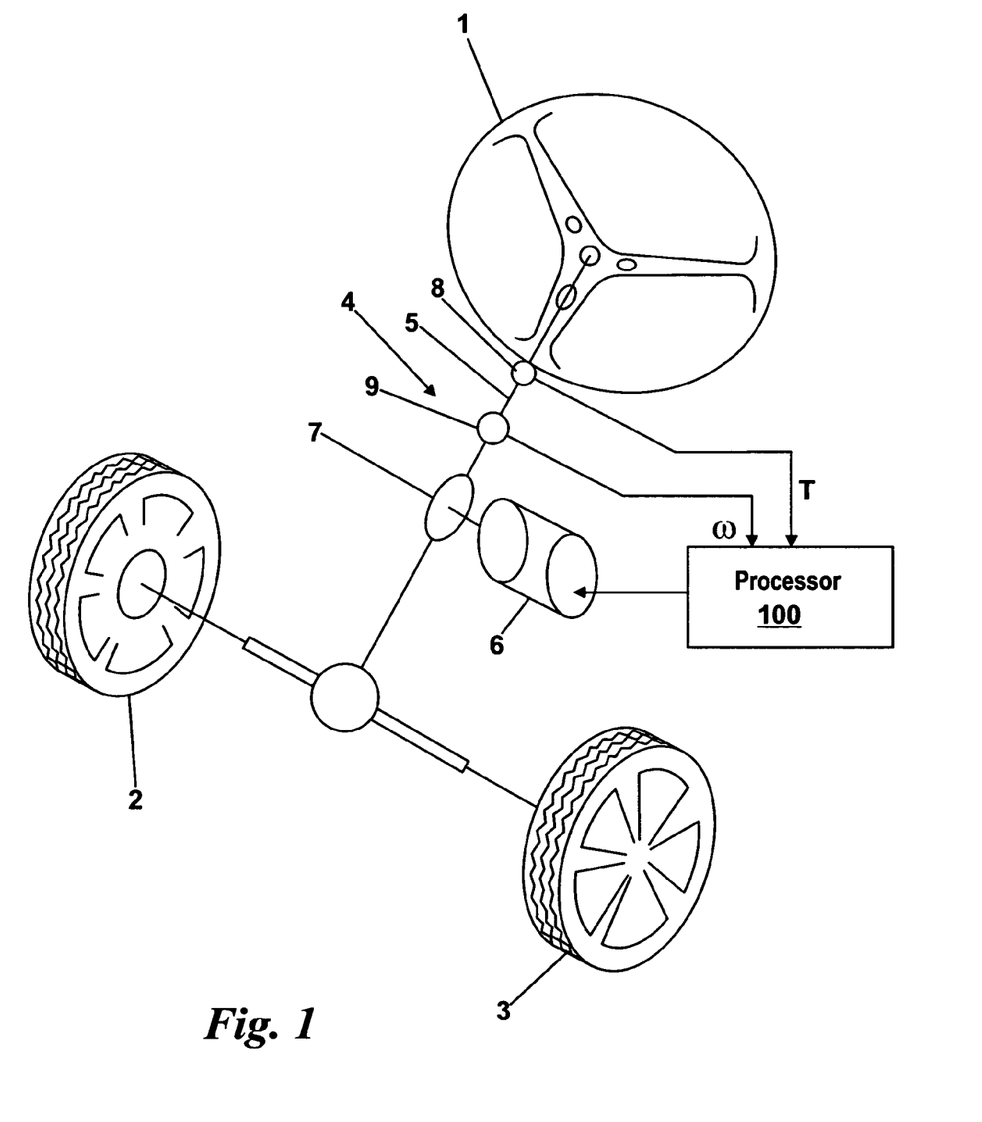
FIG. 1 is a schematic view of a typical steering system fitted to a vehicle.

FIG. 1 illustrates the key parts of an electric power steering system fitted to a vehicle. It comprises a steering wheel 1 connected to a pair of steerable roadwheels 2,3 through a steering column assembly 4. The steering column assembly 4 carries torques applied to the column 5 as the driver moves the handwheel (handwheel torque) from side to side to steer the vehicle. The system also includes an electric motor 6 which is connected to the column through a worm and wheel gearbox 7 (although it could be connected to the steering rack instead if preferred). The motor 6 is controlled by a processor 100 which instructs the motor to apply an assistance torque to the steering column 5. This assistance torque is usually of the same sense as the handwheel torque and therefore helps the driver to turn the wheel by assisting the drivers torque.

To control the motor 6 the processor 100 receives input signals from a torque sensor 8 (that measures the handwheel torque or total column torque), a position sensor 9 that measures the position of the handwheel relative to a straight ahead position, and also a vehicle speed sensor. The position and speed measurements are used to tailor the assistance torque to the driving conditions. For example, the assistance torque may be lower about the centre position and at higher speeds.

It has been appreciated by the applicant that steering systems such as the one shown in FIG. 1, like all mechanical and electro-mechanical systems, can become damaged and subject to gradual wear over time. In particular, wear can occur in the bearing joints and the worm and wheel as well as the rack gear. This may lead to failure of the joints or more likely to the joints becoming stiff and harder to turn.

It has been appreciated by the applicant that it would be desirable to monitor the condition of the steering system whilst the vehicle is in use. The vehicle of FIG. 1 therefore includes an apparatus for monitoring the condition of the steering system which is in accordance with the second aspect of the invention.

The monitoring apparatus comprises a processing means 200 in the form of a processing unit. In this example the processing unit is separate from the processor of the electric steering system although they could be one and the same processor.

Figure 2:
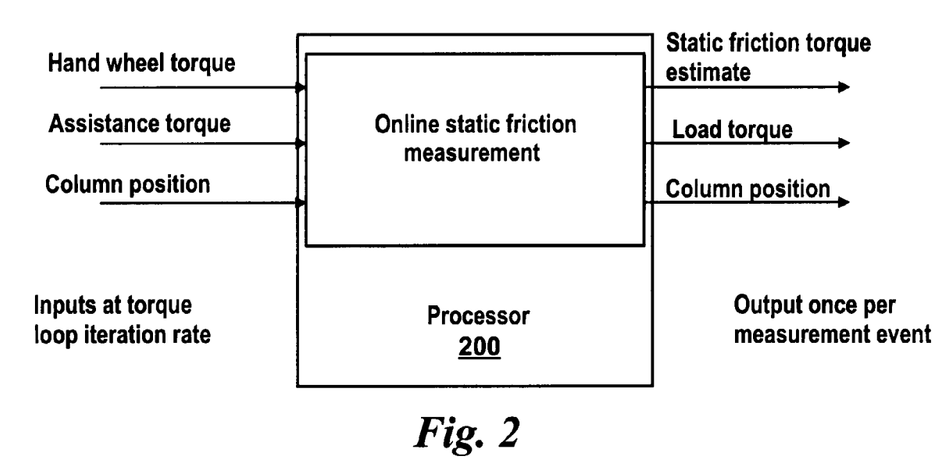
FIG. 2 is a schematic view of a monitoring apparatus that is fitted to the vehicle to monitor the condition of the steering system of FIG. 1 by estimating static friction in the steering assembly.
Figure 3A:
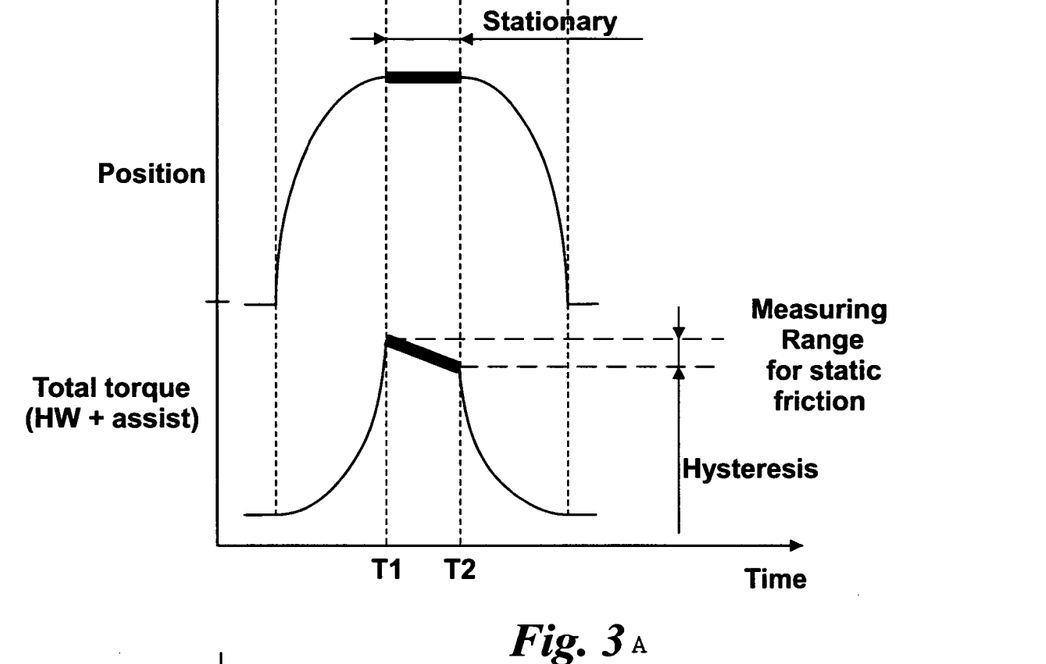
FIG. 3(a) is an ideal graph of steering position against time for the steering system during a single manoeuvre when the wheel is held momentarily stationary off centre such as during a lane change, cornering or pulling away from a kerb, and (b) is a corresponding graph showing total torque carried by the steering column against time for the same manoeuvre.
Figure 8:
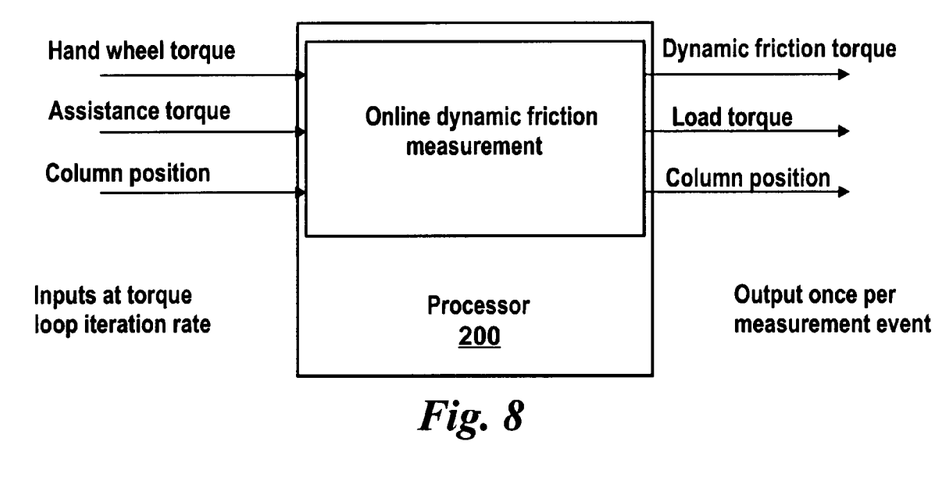
FIG. 8 is a further schematic view of a monitoring apparatus that is fitted to the vehicle to monitor the condition of the steering system of FIG. 1 by estimating dynamic friction.

The processing unit 200 is shown in FIGS. 2 and 8 of the accompanying drawings. The unit comprises a microprocessor that receives at its inputs the measurements of driver applied torque (handwheel torque) and assistance torque applied by the motor (which summed together indicate the torque carried by the steering column in this example) and the steering wheel position sensor and vehicle speed. These signals can all be taken from the electric steering processor which already uses these signals.

The microprocessor 200 is controlled by a set of program instructions stored in memory which can be read by the processor. The program instructions cause the processing unit to perform the method steps set out below to provide an estimate of the condition of the steering. This estimate is based on determining an initial estimate of the static friction in the steering system.

In a first step, the steering position value is read from the sensors and stored in memory. This measurement may have a positive or negative value depending on whether the wheel has been turned clockwise or anticlockwise away from its central rest position where the vehicle nominally travels straight ahead. The value at centre is zero in this example. The processor then checks to see if the most recent steering position reading is the same as the previous reading and is non-zero. This will indicate that the steering wheel has been moved off centre by the driver and is about to return it to centre. This will happen if the driver has turned the wheel off centre and is holding it in that position to make a constant radius turn. If the most recent and preceding column position signal values are the same, the output of the torque sensor at that instant is read and is stored in memory as a first torque measurement value for later processing. This is a measure of the total torque carried by the steering column. If the latest position reading is not the same as the preceding one the first step is repeated and no torque value is stored.

Additionally, in this embodiment the second to last reading of column position is compared with the most recent reading to determine whether the column is being moved away from centre prior to the movement stopping. If it is then the stored torque value is retained and if not it is rejected (or is not stored in the first place). Alternatively, a direction value may be stored in the memory along with the first.

Once a torque value has been stored the method moves on to its third step. In the third step, subsequent column position values continue to be compared with the preceding readings. If they remain the same the wheel is assumed to be held in a fixed position and the third step is repeated.

If the most recent column position value differs from the preceding one it is assumed that the steering column is moving again. If a direction value has been stored a check is then made to see if the steering is moving in the opposite direction to the one in which it was moving prior to stopping. If it is not then the stored torque value is rejected and the method returns to step 1 to start over. If it is in the opposite direction then the torque value at the instant that it starts to move is stored in the memory as a second torque value.

In a fifth step the microprocessor determines the elapsed time between the two torque values being obtained. This can be achieved by triggering a clock once the first value has been stored and stopping the clock as the second is stored. If the elapsed time exceeds a target time the stored values will both be rejected. Alternatively, the microprocessor may simply reject the first stored value as soon as the target elapsed time is exceeded even if no second torque value has at that time been stored.

In a sixth step, the difference between the two stored torque values is calculated. This is stored in memory. The value may then, optionally, be halved to provide an estimate of the static friction in the steering system. This last step may be performed if direct access to the estimate is needed by another vehicle function.

The difference value, or halved difference value, is then compared by the processor with a target value. This target value is prestored in the memory and represents the value that should be obtained by the processing system if the steering system is in good condition. Any changes will likely be due to damage or wear on the steering system which create more friction than expected (or in some cases perhaps less).

Of course, whilst the method steps outlined above are one possible process that could be performed by the processing unit, others are possible. The following is a simplified example of how the process could be implemented efficiently in a simple processing unit:

Step 1. On each change of position, record time, torque, position and direction (entry condition)
Step 2. Maintain max and min torque since entry
Step 3. On next change of position, check how long been in previous position and
if above threshold, treat as stationary and maintain max/min record else, treat as moving and return abs($T_{max}-T_{min}$) (exit condition)
Step 4 On exit, determine direction of exit and total time in stationary condition
if direction of exit is opposite to direction of entry and total time stationary is above threshold, result is valid
else, result is invalid and should be ignored, go back to step 1

It will be appreciated that for greatest accuracy the first and second torque values that are stored should correspond as closely as possible to the torque at the precise instant that the system enters and leaves the stationary condition. Depending on the rate at which column position values are supplied to the processing unit, it may be preferable to interpolate the torque value from sampled readings obtained just before and after the column position values indicate the stop or start of movement.

In addition, as shown in FIG. 8, the processing unit is configured to perform further steps to provide an alternative estimate of the condition of the steering system. This estimate is based on determining an initial estimate of the dynamic friction in the steering system. It does this by monitoring instances at which the steering column position passes through the same angles in opposite directions within a short period of time. In this example, the ranges are +5 to +10 degrees outward (+10 to +5 return) and −5 to −10 outward (−10 to −5 return).

Figure 13:
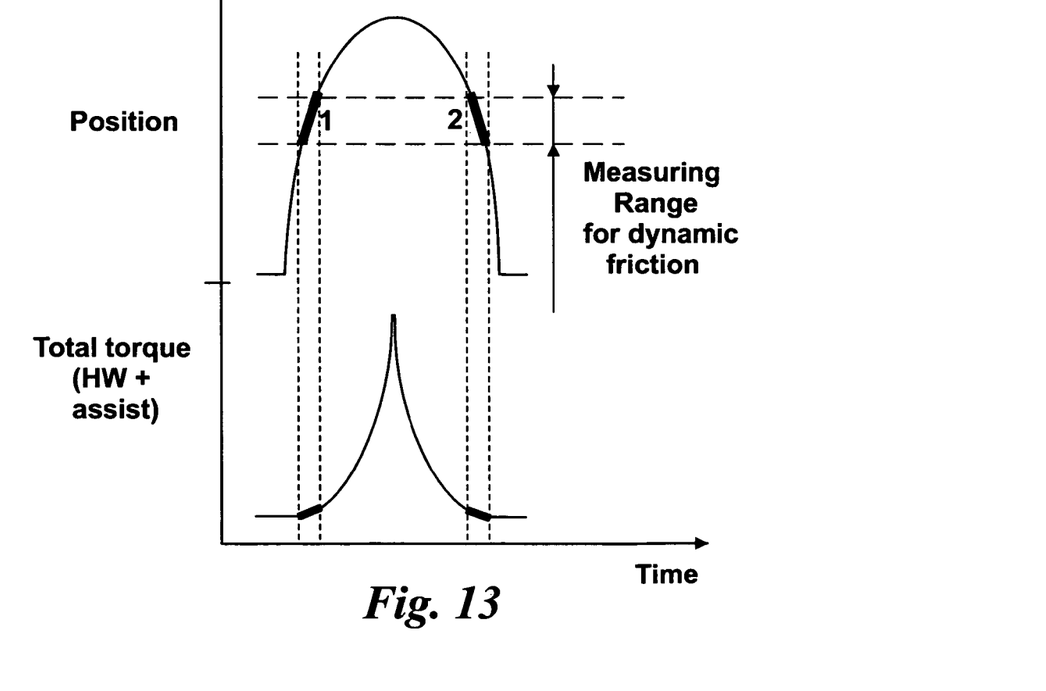
FIG. 13 is an ideal graph of steering position against time for the steering system during the outward and return movement of the wheel for a single manoeuvre such as during a lane change, cornering or pulling away from the kerb and (b) is a corresponding graph showing total torque carried by the steering column against time for the same manoeuvre.

Consider for example the passage of the steering system through two angle regions in different directions during a lane change or corner (steer away from centre followed by a return to centre).

For the outgoing range of angles (marked as 1 in FIG. 13):

$$T_{out}\omega_{out}=(T_{Lout}+T_{fout})\omega_{out}$$

Where $T_{out}$ is the torque on the outward range of measurements, $\omega_{out}$ is the outward velocity, $T_{fout}$ is the dynamic friction torque during the outward range of movements and $T_{Lout}$ is the static load on the steering over that range.

The ranges of angles 1 can be identified by logging each position reading over a period of time to build up a trace of position against time. From this trace, the exact corresponding ranges of angles (marked as 2 in FIG. 13) can be identified for the outward and return ranges.

For the return range of angles:

$$T_{rtn}\omega_{rtn}=(T_{Lrtn}-T_{frtn})\omega_{rtn}$$

where $T_{rtn}$ is the total torque measured on the return range of measurements, $\omega_{rtn}$ is the return velocity, $T_{frtn}$ is the dynamic friction torque during the return range of movements and $T_{Lrtn}$ is the static load on the steering over that range.

The processor next checks the elapsed time between the ranges 1 and 2 to determine if they are part of the same manoeuvre, e.g., a lane change or corner. The speed for each range is also checked to see if it is similar. If not the ranges 1 and 2 may be rejected as invalid for estimating dynamic torque (although limited use can still be made if they are part of a single manoeuvre with different speeds).

If the ranges are not rejected the difference between the two torques over ranges 1 and 2 can then be calculated and will yield a value that is a function of dynamic friction in the system. The processor then compares this with a prestored target dynamic friction value to determine the condition of the steering system. If the condition is worse than expected/allowed an error flag or other warning is issued.

Figure 4:
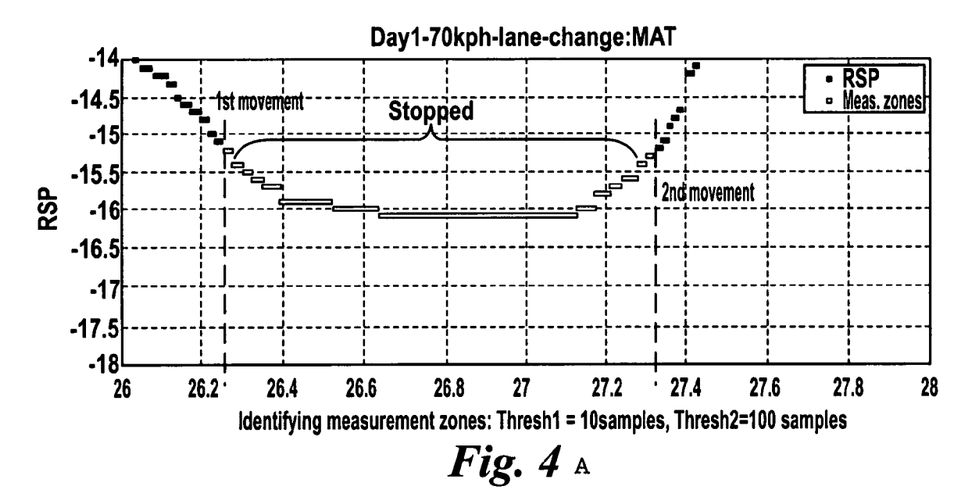
FIG. 4(a) is an actual graph of Recent steering position RSP against time for the steering system during a single manoeuvre when the wheel is held momentarily stationary off centre such as during a lane change, cornering or pulling away from a kerb for a system with normal levels of friction.
Figure 5:
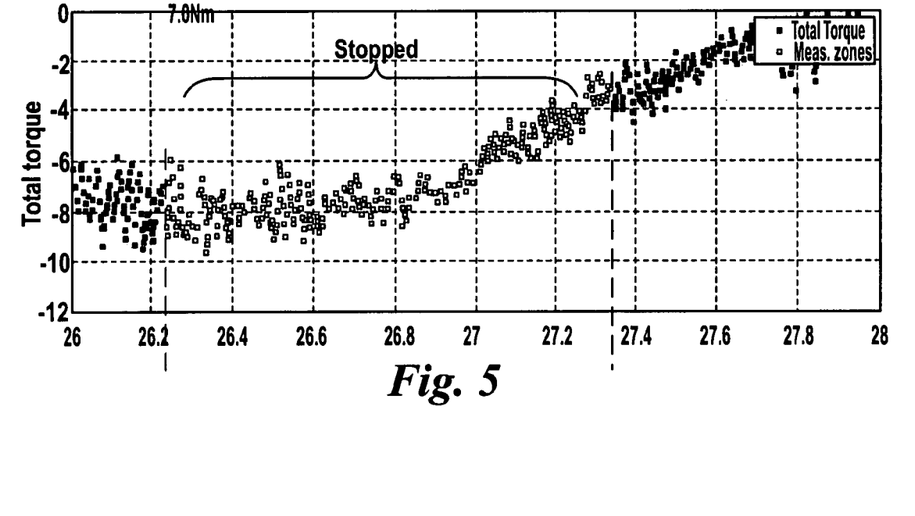
FIG. 5 is a corresponding graph to FIG. 4 showing total torque carried by the steering column against time for the same actual manoeuvre.
Figure 6:
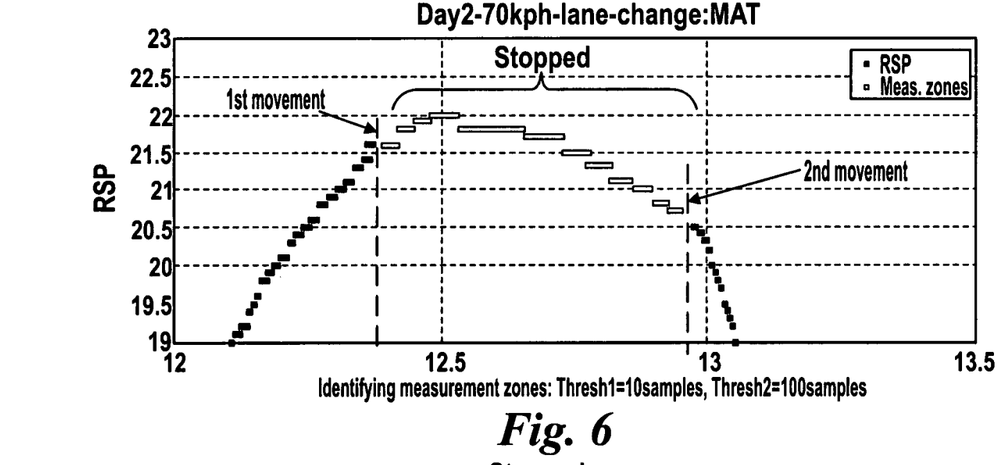
FIG. 6 is an actual graph of Recent steering position RSP against time for the steering system during a subsequent single manoeuvre when the wheel is held momentarily stationary off centre such as during a lane change, cornering or pulling away from a kerb for an excessively worn system.
Figure 7:
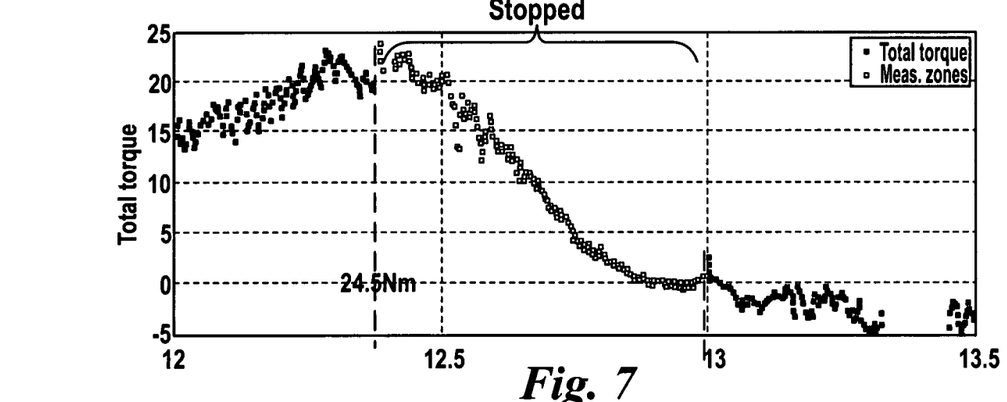
FIG. 7 is a corresponding graph to FIG. 4 showing total torque carried by the steering column against time for the same actual manoeuvre.

FIG. 4 through to FIG. 7 illustrate the application of the method steps to real data obtained by measuring the column torque (handwheel torque plus assistance torque) and steering position for a system with normal levels of friction (FIGS. 4 and 5) and again for the system with excessive static friction as shown in FIGS. 6 and 7. As can be seen, measurement zones are identified in FIGS. 4 to 7, and the measurements obtained clearly indicate excessive wear in the second case. Once the measurements were processed to determine static friction values and compared with a target friction value the system was capable of issuing a warning that the condition of the steering had deteriorated.

Figure 9:
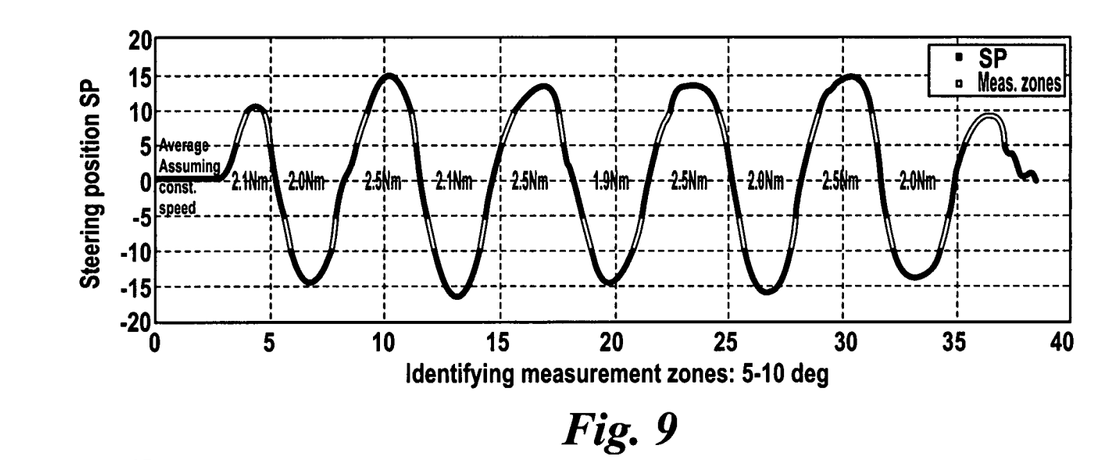
FIG. 9 is an actual graph of steering position against time for the steering system during the outward and return ranges of movement of the wheel for multiple manoeuvres such as during a lane change, cornering or pulling away from the kerb for a system with normal amounts of friction.
Figure 10:
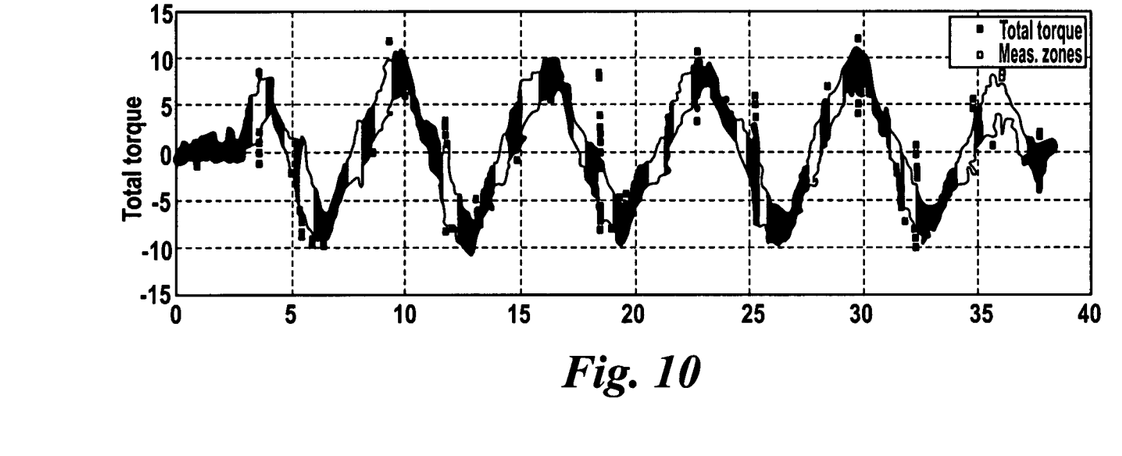
FIG. 10 is a corresponding graph to FIG. 9 showing total torque carried by the steering column against time for the same manoeuvres for a system with normal amounts of friction.
Figure 11:
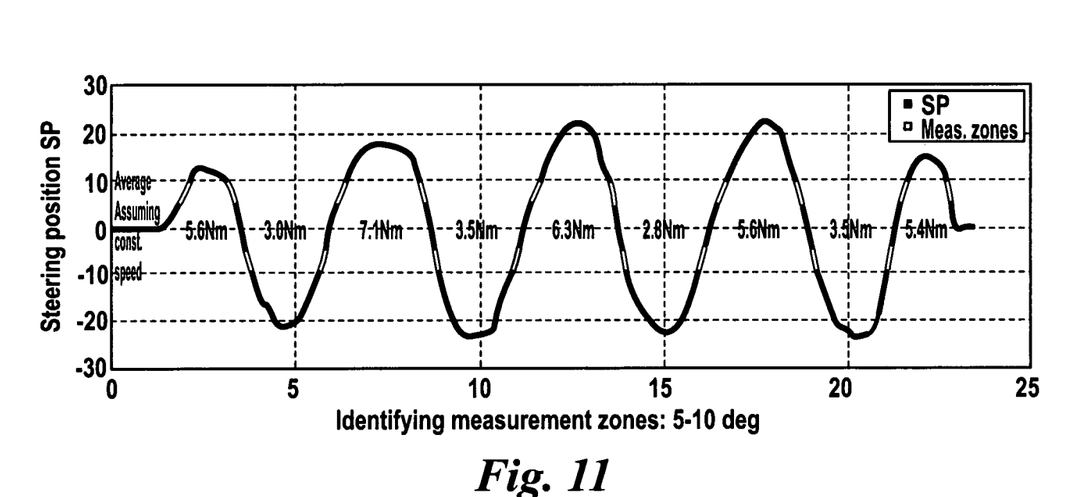
FIG. 11 is an actual graph of steering position against time for the steering system during the outward and return ranges of movement of the wheel for multiple manoeuvres such as during a lane change, cornering or pulling away from the kerb for an excessively worn steering system.
Figure 12:
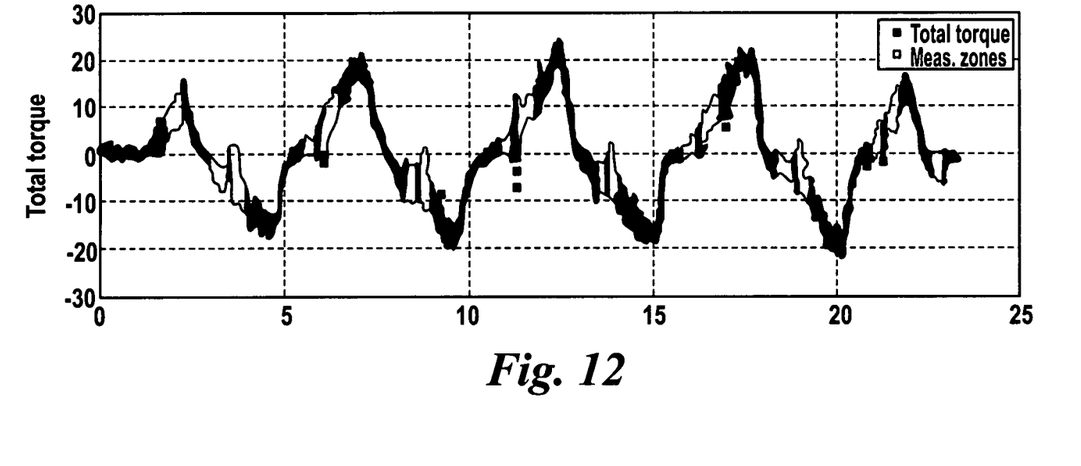
FIG. 12 is a corresponding graph to FIG. 11 showing total torque carried by the steering column against time for the same manoeuvres for an excessively worn system.

FIGS. 9 through 11 show similar ranges of measurement for each case (normal and excessive friction) which can be processed to give a measure of dynamic friction in each case. Again, post processing a change in dynamic friction was identified and a warning of an excessively worn condition could be issued.

The method and apparatus disclosed provides a direct measurement of system static and/or dynamic friction in units of torque whilst it has been shown that the system load can additionally be derived. The method of monitoring condition by measuring friction as proposed has several advantages. Firstly, the conditions required are unavoidable in normal driving manoeuvres, hence no additional stimuli are required. It is capable of diagnosing excessive static and/or dynamic friction very early in a journey (during the first manoeuvre). It can be implemented efficiently, requiring minimal computation and modest storage, and its inputs are readily available within the electric power assisted steering systems processor. It is independent of external factors such as vehicle type, load, road surface etc. and thus does not require tuning for different vehicles and is insensitive to differing road conditions and vehicle loads.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

The invention claimed is:

1. A method of monitoring a steering system which includes a steering wheel, the method comprising the steps of:
   (a) repeatedly measuring the angular position of said steering wheel,
   (b) identifying from said angular position measurements of said steering wheel position a first moment in time at which the steering wheel comes to rest in an off centre position following movement in a first direction away from a straight ahead position,
   (c) measuring the torque applied to the steering system at that first moment in time,
   (d) identifying from the measurements of steering wheel position a second moment in time at which the steering wheel first starts to moves away from the off centre position in the opposite direction to the first direction,
   (e) measuring the torque applied to the steering system at that second moment in time,
   (f) determining the time elapsed between the first and second moments in time and, in the event that the elapsed time exceeds a target limit time rejecting the calculated static friction value,
   (g) determining the vehicle speed at the time of the two measurements, and rejecting the calculated static friction value if the speeds are not similar,
   (h) calculating the difference between the measured torques at the first moment of time and at the second moment of time to provide a calculated static friction value that is dependent upon the static friction $T_{friction}$ in the steering system,
   (i) rejecting the calculated static friction value when (i) an elapsed time between the first and second moments in time exceeds a target limit time, or (ii) if the vehicle speeds at the time of the two measurements are not similar; and
   (j) indicating that damage or wear has occurred in the steering system when the calculated static friction value differs from a target static friction value.

2. The method of claim 1 further including the following sequence of steps is performed:
   identifying a change in position of the steering wheel by repeatedly monitoring the output of a position sensor and on each change in the output, at a first moment in time, storing in an electronic memory the time, torque, position and direction of movement of the wheel as an entry condition;

continuing to store the maximum and minimum torque since the time of storing of the entry condition;

upon detecting the next change in position of the steering wheel, at a second moment in time, comparing the current time with the stored time to determine how long the steering wheel has been stationary, continuing to maintain minimum and maximum torque value record upon the elapsed time being above a threshold, and setting an exit condition and reporting the difference between minimum and maximum torque values upon the elapsed time being less than the threshold.

3. The method of claim 2 which further includes the steps of:

recording the direction of movement of the steering wheel on exit and total time elapsed between recording entry and exit conditions, raising a flag to indicate the difference measured is a valid measurement if the direction of movement is opposite and the total time exceeds a threshold, and rejecting the measurement as invalid if either of the above conditions is not met.

4. The method of claim 1 which additionally includes the steps of estimating dynamic friction by:

measuring the torque carried by the steering column as it passes through an outward range of steering angles while moving away from the centre position;

measuring the torque carried by the steering column when subsequently passing through the same range of steering angles as the steering returns towards the centre position;

measuring the steering column velocity as it passes through the range of angles, and processing the torque measurements to estimate dynamic friction, and indicating that damage or wear has occurred in the steering system when the estimated dynamic friction differs from a predetermined target dynamic friction value.

5. The method of claim 4 which comprises measuring the elapsed time between the steering passing through the two ranges of angles, and rejecting the torque measurements if the time exceeds a predetermined limit.

6. The method of claim 5 which includes the step of rejecting the measurements over the two ranges of angles if the measured steering column velocity on the outward and return passes differs.

7. The method of claim 4 which further comprises determining a plurality of different estimates of dynamic friction, each one corresponding to a different steering velocity.

8. The method of claim 1 which includes the step of raising an alarm or warning in the event that the comparison with the target indicates wear or damage of the steering system.

9. The method of claim 1 further including providing a data carrier and a processor with the data carrier carrying a program instruction that, when running on the processor, causes the processor to perform the steps of the method.

10. Apparatus for monitoring a steering system fitted to a vehicle comprising:

a torque sensor which provides an output signal indicative of the torque carried by the steering system, a column position sensor which measures the angular position of the steering wheel; and processing means arranged to process respective output signals received from the torque sensor and the column position sensor, in which the processing means is arranged to:

repeatedly measure the angular position of a steering wheel;

identify from the measurements of steering wheel position a first moment in time at which the steering wheel comes to rest in an off centre position following movement in a first direction away from a straight ahead position;

measure the torque applied to the steering system at that first moment in time, identify from the measurements of steering wheel position a second moment in time at which the steering wheel first starts to moves away from the off centre position in the opposite direction to the first direction;

measure the torque applied to the steering system at that second moment in time;

determine the time elapsed between the first and second moments in time and, in the event that the elapsed time exceeds a target limit time rejecting the calculated static friction value, determine the vehicle speed at the time of the two measurements, and rejecting the calculated static friction value if the speeds are not similar, calculate the difference between the measured torques at the first moment of time and second moment of time to provide a static friction value that is dependent upon the static friction $T_{friction}$ in the steering system;

reject the calculated static friction value when (i) an elapsed time between the first and second moments in time exceeds a target limit time, or (ii) if the vehicle speeds at the time of the two measurements are not similar; and indicate that damage or wear has occurred in the steering system when the calculated static friction value differs from a target static friction value.

11. The apparatus of claim 10 in which the processing means is further arranged to determine the time elapsed between the first and second moments in time and, in the event that the elapsed time exceeds a target limit time, reject the calculated static friction value.

\* \* \* \* \*